United States Patent
Lembo, III et al.

(10) Patent No.: US 8,469,287 B1
(45) Date of Patent: Jun. 25, 2013

(54) SPRINKLER ASSEMBLY ADAPTED FOR USE WITH EXISTING IRRIGATION SYSTEMS

(76) Inventors: Carl Lembo, III, Hudson, MA (US); Kristin Lembo, Hudson, MA (US)

( * ) Notice: Subject to any disclaimer, the term of this patent is extended or adjusted under 35 U.S.C. 154(b) by 187 days.

(21) Appl. No.: 12/807,618

(22) Filed: Sep. 9, 2010

Related U.S. Application Data

(60) Provisional application No. 61/276,176, filed on Sep. 9, 2009.

(51) Int. Cl.
*A01G 25/06* (2006.01)

(52) U.S. Cl.
USPC .............................................. 239/201; 239/1

(58) Field of Classification Search
USPC ............... 239/200–205, 1, 11, 450, 600, 548
See application file for complete search history.

(56) References Cited

U.S. PATENT DOCUMENTS

| | | | |
|---|---|---|---|
| 1,400,533 A | 12/1921 | Engel | 239/559 |
| 1,539,331 A | 2/1925 | Siemann | 239/559 |
| 2,048,125 A | 7/1936 | Irving | 239/514 |
| 2,290,258 A | 7/1942 | Svet | 239/567 |
| 2,519,738 A | 8/1950 | Butler | 299/56 |
| 2,697,008 A | 12/1954 | Rowley | 239/498 |
| 2,714,037 A | 7/1955 | Singer | 239/201 |
| 2,751,250 A | 6/1956 | Block | 299/60 |
| 2,791,466 A | 5/1957 | Crisp | 299/75 |
| 2,793,910 A | 5/1957 | Wiebe | 299/60 |
| 2,805,099 A | 9/1957 | Bailey | 299/60 |
| 2,863,698 A | 12/1958 | Richards | 239/64 |
| 2,883,114 A | 4/1959 | Frank | 239/19 |
| 3,263,929 A | 8/1966 | Seablom | 239/204 |
| 3,321,138 A | 5/1967 | Curry | 239/99 |
| 3,790,082 A | 2/1974 | Pochard | 239/240 |
| 3,964,687 A | 6/1976 | Sheets | 239/226 |
| 4,014,502 A | 3/1977 | Sheets | 239/206 |
| 4,019,686 A | 4/1977 | Palma | 239/205 |
| 4,087,049 A | 5/1978 | Traina | 239/267 |
| 4,119,275 A | 10/1978 | Hunter | 239/456 |
| 4,146,181 A | 3/1979 | Soos | 239/288.5 |
| 4,154,404 A | 5/1979 | Clawson | 239/563 |
| 4,269,354 A | 5/1981 | DeWitt | 239/97 |
| 4,281,793 A | 8/1981 | DeWitt | 239/11 |
| 4,369,922 A | 1/1983 | Vikre | 239/454 |
| 4,417,691 A | 11/1983 | Lockwood | 239/206 |
| 4,543,985 A | 10/1985 | Healy | 137/505.25 |
| 4,884,751 A | 12/1989 | Pettit | 239/468 |
| 5,004,157 A | 4/1991 | Martell | 239/205 |
| 5,031,840 A | 7/1991 | Grundy | 239/456 |
| 5,074,708 A | 12/1991 | McCann | 405/38 |
| 5,092,556 A * | 3/1992 | Darling et al. | 248/519 |
| 5,150,838 A | 9/1992 | Roberts | 239/201 |
| 5,228,625 A | 7/1993 | Grassberger | 239/558 |
| 5,267,689 A | 12/1993 | Forer | 239/11 |
| 5,355,905 A | 10/1994 | Burgess | 137/1 |

(Continued)

*Primary Examiner* — Davis Hwu
(74) *Attorney, Agent, or Firm* — Bay State IP, LLC

(57) ABSTRACT

A sprinkler assembly for use with existing irrigation systems adapted to be an integral component controlled and operated by the system. The sprinkler assembly includes at least one sprinkler head having a removable top coupled thereto by an attachment means. A female inlet removably couples the sprinkler head to a swing joint, which is buried below the sprinkler head and connects the sprinkler head to the irrigation feed. The removable top has a plurality of openings for exporting water from the irrigation feed outwardly therefrom. A top surface of the sprinkler head includes crushed stone for stabilizing the sprinkler assembly. Additional stabilizing means include pointed flanges driven into the ground.

10 Claims, 2 Drawing Sheets

U.S. PATENT DOCUMENTS

| | | | |
|---|---|---|---|
| 5,413,134 A | 5/1995 | Burgess | 137/1 |
| 5,803,363 A | 9/1998 | Matsumura | 239/200 |
| 5,931,385 A | 8/1999 | Miller | 239/288 |
| 5,947,386 A | 9/1999 | Dick et al. | 239/201 |
| 6,227,455 B1 | 5/2001 | Scott | 239/1 |
| 6,386,464 B1 | 5/2002 | Watson | 239/203 |
| 6,402,048 B1 | 6/2002 | Collins | 239/63 |
| 6,494,386 B1 | 12/2002 | Banu | 239/288 |
| 7,004,677 B1 | 2/2006 | Ericksen | 405/51 |
| 7,159,795 B2 | 1/2007 | Sesser | 239/203 |
| 8,042,748 B2 * | 10/2011 | Hagaman | 239/18 |
| 2003/0213856 A1 | 11/2003 | Sirkin | 239/203 |
| 2004/0195358 A1 | 10/2004 | Santiago | 239/240 |

\* cited by examiner

SPRINKLER ASSEMBLY ADAPTED FOR USE WITH EXISTING IRRIGATION SYSTEMS

CROSS-REFERENCE TO RELATED APPLICATION

This application claims the benefit of provisional patent application Ser. No. 61/276,176, filed in the United States Patent Office on Sep. 9, 2009.

BACKGROUND OF THE INVENTION

The present invention relates to sprinklers, and more particularly, to a sprinkler assembly adapted for use with existing professional irrigation systems. The sprinkler system facilitates a water park atmosphere that is applicable in the backyard, on a playground, in a schoolyard, or in a courtyard.

FIELD OF THE INVENTION

Water games are a fun and refreshing way to beat the heat and get exercise. Families travel to commercial water parks to enjoy a variety of water sports and games. Water sports and games have also been manufactured for use in the backyard or park. Families have abandoned the antiquated lawn sprinkler and now use above-ground pools, slip and slides and other lawn based water toys for their summer recreational needs. However, these water devices and sprinklers may pose harm to users and the lawn they occupy.

Unlike other sprinkler systems on the market the present invention is buried flush with the sub grade. No portion of the sprinkler system ever pops up over the grass or plant material, thereby eliminating injury caused by tripping or hitting the device. Such a unique design protects both the user and the sprinkler system from damage. Additionally, the present invention is electronically controlled through an irrigation timer of an existing irrigation system thereby eliminating the need for long hoses. The absence of a hose protects not only those who interact with the present invention but also protects the grass from damage caused by the hose.

The present invention allows any residence, park, hotel, or commercial location with an irrigation system to be equipped with features similar to a water park. As no hoses are required for the present invention to function, the invention requires no maintenance and provides season after season of enjoyment.

DESCRIPTION OF THE RELATED ART

U.S. Pat. No. 2,793,910 to Wiebe relates to a sprinkler system and a prefabricated plastic sprinkler head primarily adapted for use in underground sprinkling system such as are installed for the irrigation of lawns, gardens, or the like.

U.S. Pat. No. 2,805,099 to Bailey relates to sprinkling systems imbedded in the earth for the watering of lawns and similar areas. The invention employs a tough plastic material for the various parts of the assembly, and to present constructions which are well adapted for production from such a plastic substance.

U.S. Pat. No. 2,519,738 to Butler relates to a lawn sprinkler and particularly to a simple type of dome shaped lawn sprinkler having no movable parts. The sprinkler unit has a swivel nut on one of its members so that the sprinkler unit as a whole can be adjustable relative to the end of the hose.

U.S. Pat. No. 2,791,466 to Crisp relates to improvement of lawn sprinklers and particularly to a novel sprinklers to which requires no screw threaded coupling to attach to the standard garden hose.

U.S. Pat. No. 5,947,386 to William and Rodgers relates to a sprinkler which includes an in-ground sprinkler head connected to a surface connector. The surface connector includes a semi-flexible tube connected to curved pipe fittings and ending on the top with a quick-connect device attached to a swiveling mechanism to allow easy connection and disconnection from a garden hose of any in-ground sprinkler head. The invention is to allow easy connection and disconnection of an in-ground sprinkler from a garden hose and to provide a connector that permits an in-ground sprinkler head to be used with an above ground hose.

U.S. Pat. No. 2,751,250 to Block relates to a sprinkler guard for permanent lawn sprinklers of the type that are installed in lawns so as to be substantially flush with the upper surface of the ground in order not to interfere with or injure a lawn mower.

U.S. Pat. No. 5,931,385 to Miller relates to a cover for a sprinkler head for a sprinkler system being associated with a lawn system. The cover is a dome shaped disk with a center aperture to accommodate the sprinkler head. At least three conically shaped posts are attached on the underside of the cover to anchor the cover to the ground.

U.S. Pat. No. 4,087,049 to Traina relates to an improved sprinkling device for use in lawn and garden sprinkling systems.

U.S. Pat. No. 6,402,048 to Collins is for a sprinkler system and a sprinkler head design, namely, a sprinkler system having one low pressure water feed line that serves a plurality of individually actuated and programmed sprinkler heads.

U.S. Pat. No. 6,494,386 to Banu relates to sprinkler head housings that hold, support, and provide easy access to pop-up sprinkler heads.

U.S. Pat. No. 6,227,455 to Scott relates to irrigation equipment, and more particularly, to sprinklers used to irrigate lawns, playing fields, golf courses and the like.

U.S. Pat. No. 2,697,008 to Rowley relates to improvement in atomizing sprinkler heads and a principle object of the invention is to provide a novel and improved device of this type characterized by highly efficient operation and improved functional characteristics.

U.S. Pat. No. 5,228,625 to Grassberger is directed to a sprinkler head comprising a sprinkler body having an inlet and an outlet, a sprinkler base which is detachably fastened at the sprinkler body and closes the outlet.

U.S. Pat. No. 4,884,751 to Pettit relates to lawn sprinklers and more particularly to a sprinkler of molded plastic construction constructed of two molded pieces cemented together and having a tangential inlet opening and a top spray opening.

U.S. Pat. No. 2,290,258 to Svet relates to a lawn sprinkler and one object thereof is to provide a sprinkler having an improved nozzle adapted for use in connection with a sprinkler of a system wherein a number of sprinklers are connected with an underground supply pipe.

U.S. Pat. No. 5,267,689 to Forer relates to automatic sprinkler systems and more specifically to an improved sprinkler head that may adjusted by the user to direct the flow of water over a ground area to be watered that is irregular in shape.

U.S. Pat. No. 5,031,840 to Grundy relates to a sprinkler nozzle for a water sprinkler which forms radially extending streams of water.

U.S. Pat. No. 4,269,354 to DeWitt relates to water sprinklers and particularly to water sprinklers for producing a predetermined but variable pattern of water coverage.

U.S. Pat. No. 4,014,502 to Sheets relates to projectable sprinklers with a rotating nozzle or nozzles which are automatically projected or advanced to a position above the surrounding ground level when water is supplied under pressure to the sprinkler, to sprinkler heads which can be used on a projectable or non-projectable sprinkler, to stationary sprinklers for use on the surface of the ground, and to an apparatus for increasing the area wetted by a sprinkler.

U.S. Pat. No. 3,964,687 to Sheets relates to sprinkler heads which can be used on a projectable or non-projectable sprinkler, to stationary sprinklers for use on the surface of the ground U.S. Pat. No. 4,369,922 to Vikre relates to water distribution systems and devices, and is specifically directed to a center-pivot, field irrigation system capable of operating at low or high water pressure, and a constant-volume sprinkler head for such irrigation systems.

U.S. Pat. No. 2,883,114 to Frank relates to lawn sprinkler and the like, and more particularly, to an illuminating attachment therefore and to illuminated sprinkling devices.

U.S. Pat. No. 4,154,404 to Clawson relates to sprinkler heads for discharging fluids in a circular pattern of variable diameter or in a variable size segment of such circular pattern and more particularly to an improved structure for such a sprinkler head which structure has reduced size and is simple and inexpensive to fabricate.

U.S. Pat. No. 2,048,125 to Irving relates to sprinkler heads, and with regard to certain more specific features, to sprinkler heads for permanent sprinkler installation.

U.S. Pat. No. 4,119,275 to Hunter relates generally to fluid spray apparatus, particularly to irrigation devices, and more particularly to an improved fluid spray head for sprinkler apparatus.

U.S. Pat. No. 7,159,795 to Sesser relates to sprinklers and, specifically, to a sprinkler that incorporates adjustable arc and/or adjustable flow rate features.

U.S. Pat. No. 5,150,838 to Roberts relates to improvements in the underground piping employed with lawn sprinkler systems.

U.S. Pat. No. 4,543,985 to Healy relates to pressure regulators for irrigation sprinklers, or the like, and especially to a pressure regulator having a generally direct flow of fluid through the center thereof and has a pressure controller for dampening the oscillations in the pressure regulator and in the pressure of the fluid passing therethrough.

U.S. Pat. No. 3,321,138 to Curry relates to control means for automatically controlling the intermittent discharge of liquid under pressure from a pressure source.

U.S. Pat. No. 5,004,157 to Martell relates to an improved underground sprinkler system having pop-up nozzles.

U.S. Pat. No. 3,790,082 to Pochard relates to sprinklers or spraying devices and is concerned with devices for spraying or sprinkling a liquid under pressure over a surface from a stationary or movable station.

U.S. Pat. No. 5,803,363 to Matsumura relates to a sprinkler head for a liquid sprinkler.

U.S. Pat. No. 1,539,331 to Siemann relates to lawn sprinklers.

U.S. Pat. No. 1,400,533 to Engel relates to garden and lawn sprinkler systems, and more particularly to an improved underground sprinkler system having pop-up nozzles.

U.S. Pat. No. 2,714,037 to Singer relates to sprinkler system which may be completely prefabricated and marketed as a unit and may be installed as a buried system.

U.S. Pat. No. 2,863,698 to Richards relates to apparatus and methods of supplying water to soil whenever the moisture content of the soil is depleted.

U.S. Pat. No. 4,146,181 to Soos relates to a guard ring for a flush-type lawn sprinkler head.

U.S. Pat. No. 5,355,905 to Burgess relates to underground sprinkler systems used on residential and commercial property for automatic lawn watering.

U.S. Pat. No. 5,413,134 to Burgess relates to underground sprinkler systems used on residential and commercial property for automatic lawn watering.

U.S. Pat. No. 4,417,691 to Lockwood relates to water sprinkler devices including apparatus for driving a sprinkler spray head through a prescribed accurate path for irrigation of a soil area.

United States Patent Application No. 2003/0213856 to Lockwood relates to an improved sprinkler head which allows for turning water flow off and on directly at the sprinkler head.

U.S. Pat. No. 3,263,929 to Seablom relates to sprinkler heads and systems of a type employing extensible heads.

U.S. Pat. No. 7,004,677 to Ericksen relates to an apparatus and method for containing one or more underground irrigation valves.

U.S. Pat. No. 5,074,708 to McCann provides an improved underground water control system for tennis courts.

U.S. Pat. No. 4,281,793 to DeWitt relates to water sprinklers for producing a predetermined but easily variable pattern of water coverage.

U.S. Pat. No. 4,019,686 to Palma relates to a water sprinkler of the kind employing heads and nozzles actuated by water flowing at variable pressure controlled by modulating valves.

United States Patent Application No. 2004/0195358 to Crooks provides an improved rotary sprinkler system that addresses the aforementioned and other undesirable aspects of prior art rotary sprinkler systems.

U.S. Pat. No. 6,386,464 to Watson relates to a lawn irrigation device, more particular a device that transports water from an above ground water supply to underground sprinkler devices.

While these units may be suitable for the particular purpose employed, or for general use, they would not be as suitable for the purposes of the present invention as disclosed hereafter.

SUMMARY OF THE INVENTION

It is an object of the invention to enhance the use of existing professional irrigation systems to facilitate a water park atmosphere in a backyard, on a playground, in a courtyard, or elsewhere. Accordingly, the present invention is a sprinkler assembly including at least one sprinkler head and removable top and is adapted for use with existing irrigation systems to provide a water park atmosphere.

It is another object of the invention to provide a system which is easily installed and does not damage the user's lawn. Accordingly, sprinkler assembly of the present invention is adaptable with existing irrigation system eliminating hoses to trip over or cause damaging brown burn lines on the user's lawn.

It is another object of the invention to provide sprinkler assembly that is easily accessible for cleaning the irrigation feed. Accordingly, the removable top of the present invention allows the user convenient access to the sprinkler head and the irrigation feed for easy cleaning.

It is another object of the invention to provide a sprinkler assembly which eliminates tripping caused by an obtrusive sprinkler head extending upwardly from the lawn while children play or adults walk along the lawn. Accordingly, the sprinkler head of the present invention is buried flush within the ground surface of the lawn and does not have to extend upwardly over the grass or plant material when in use, thereby prohibiting tripping over or breaking while in operation.

It is another object of the invention to provide a sprinkler assembly which conserves water and is adaptable with existing irrigation systems. Accordingly, the sprinkler assembly of the present invention is electronically controlled by an irrigation timer, for conserving water and setting a specific time to turn off.

It is yet another object of the invention to build a sprinkler assembly having solid and durable construction that is both gentle on the feet and impervious to the elements such as snow, ice, lawn mowers, thatching, and slice seeding. Accordingly, the sprinkler head and removable top of the present invention are made from durable and sturdy prefabricated plastic which is gentle and withstands natural elements.

It is another object of the invention to provide a, sprinkler assembly that is easily winterized and eliminates the need to coil up hoses and bring them in for the winter. Accordingly the sprinkler assembly of the present invention couples with the existing irrigation system in use throughout the year without the need for extra hoses and time consuming clean-up and winterization.

It is another object of the invention to provide a sprinkler assembly that can adjust the water pressure while in use. Accordingly, sprinkler assembly of the present invention can be installed with an adjustable water flow controller integrally coupled within the irrigation system for providing a means for selectively adjusting the water pressure at each sprinkler head as well as the ability to provide increased pressure at selective sprinkler heads or zones in order to provide a true water park "maze of water" effect.

This invention is a sprinkler assembly for use with existing irrigation systems adapted to be an integral component controlled and operated by the system. The sprinkler assembly includes at least one sprinkler head having a removable top coupled thereto by an attachment means. A female inlet removably couples the sprinkler head to a swing joint, which is buried below the sprinkler head and connects the sprinkler head to the irrigation feed. The removable top has a plurality of openings for exporting water from the irrigation feed outwardly therefrom. A top surface of the sprinkler head includes crushed stone for stabilizing the sprinkler assembly. Additional stabilizing means include pointed flanges driven into the ground.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
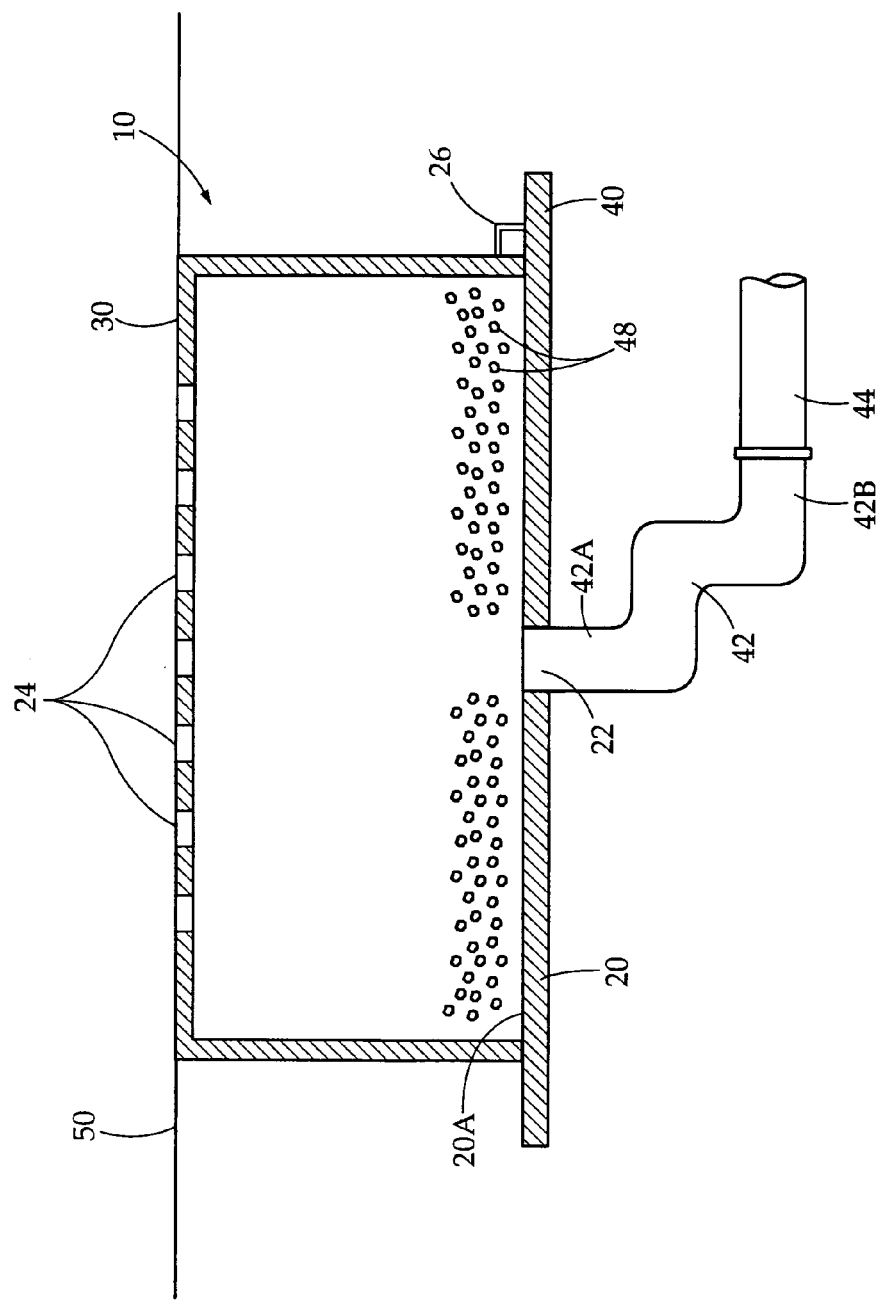
FIG. 1 is a diagrammatic perspective view of a sprinkler assembly of the present invention, illustrating one sprinkler head for use with an existing irrigation system.

FIG. 1 illustrates the sprinkler assembly 10 of the present invention. The sprinkler assembly 10, uniquely winterized, is for use with existing professional irrigation systems and is adapted to be an integral component controlled and operated by the existing irrigation system. In its broadest context, the sprinkler assembly 10 includes at least one sprinkler head 20 and a removable top 30.

The sprinkler head 20 and removable top 30 are preferably made of durable solid materials, such as prefabricated plastic or other similar materials which are gentle on the feet and impervious to the elements (including snow, wind, rain, lawn mowing, thatching, slice seeding). Preferably, the sprinkler head 20 is substantially rectangular and approximately ten inches in length, twelve inches in width, and one inch in height, although alternative dimensions are contemplated. In the preferred embodiment, the removable top 30 is substantially rectangular and approximately eight inches in length, ten inches in width, and four inches in height, although alternative dimensions are contemplated. It is also contemplated that other shapes may be suitable for the removable top. Preferably, the sprinkler head 20 and removable top 30, when in use, are positioned flush with the ground surface 50 so as to prevent tripping or breaking while in operation.

The sprinkler head 20 is removably coupled to a female inlet 22 wherein the female inlet 22 is substantially wide to accommodate a swing-joint 42, preferably three-quarters to one-inch in diameter. The swing joint 42 is utilized to reduce any stress on the fittings as well as flexibility in the setting unity.

In the preferred embodiment, the swing joint 42 connects the sprinkler head 20 to the irrigation feed 44. The swing joint has a first end 42A which couples to the female inlet 22 of the sprinkler head 20 and a second end 42B which couples to the irrigation feed 44.

In an alternative embodiment, the sprinkler head 20 is coupled to the irrigation feed 44 by a flexible hose. The flexible hose has a first end which couples to the female inlet of the sprinkler head and a second end which has an irrigation inlet that is adapted to accept the existing underground irrigation feed. Preferably, the irrigation inlet is three-quarters to one-inch in diameter.

The removable top 30 includes a plurality of openings 24 which export water from the female inlet 22, swing joint 42, and irrigation feed 44 above the ground surface 50 in a plurality of different fashions, directions and patterns, based on the orientation and design of the openings 24. It is contemplated that the openings 24 can be a plurality of shapes and sizes to create ideal water flow through the removable top 30.

The sprinkler head 20 also includes a top surface 20A which couples the sprinkler head to the removable top 30 by an attachment means 26. Preferably, the attachment means 26 is a set of screws, which are easily installed and removed for access to the sprinkler head for servicing and cleaning the unit, as needed.

In an alternate embodiment, it is contemplated that the removable top 30 can include a membrane layer, which extends over each opening and prohibits the openings 24 from clogging during use or in between uses.

In alternate embodiments, the sprinkler head has a rotating disk coupled to the top surface positionable adjacent to the female inlet such that the water flowing from the irrigation feed and swing joint through the female inlet passes through the rotating disk. The rotating disk has extensions, similar to fins or paddles, with a plurality of holes for letting water pass therethrough. The rotating disk provides increased variety and speed in which orientation and design of the water is uniquely exported through the plurality of openings on the removable top.

Figure 2:
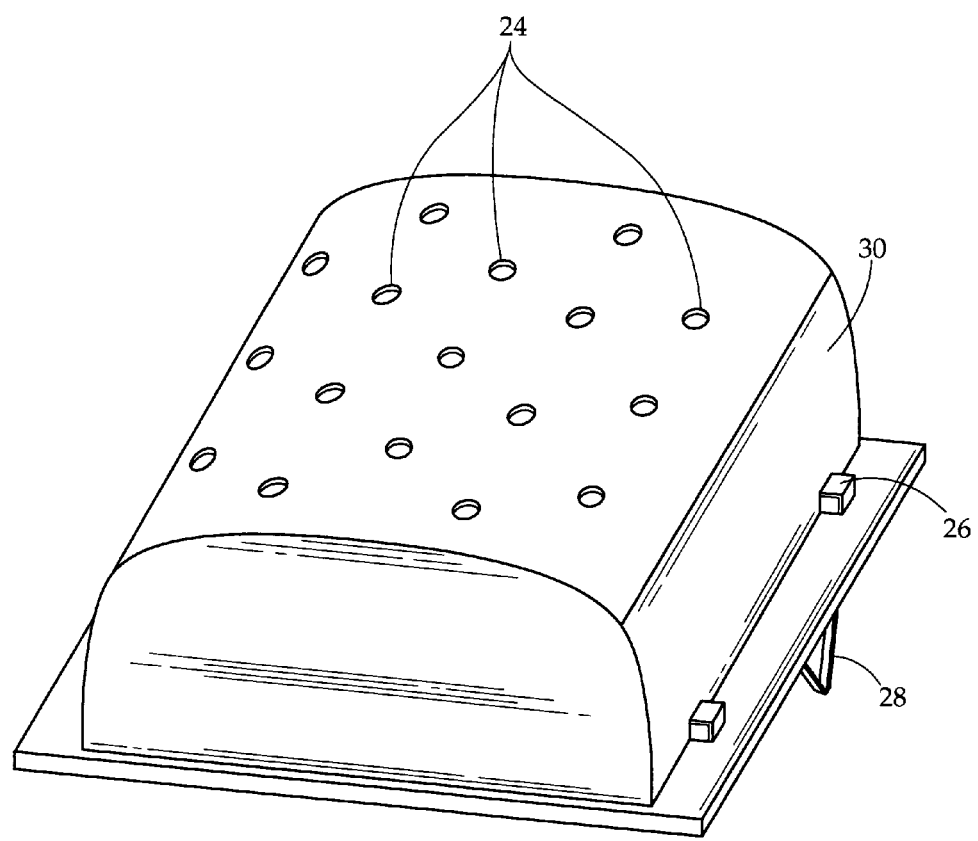
FIG. 2 is a front plan view of a sprinkler assembly of the present invention, illustrating the outer view of the sprinkler head with the removable top attached to the sprinkler head.

The top surface 20A of the sprinkler head 20 includes a base of crushed stone 48 positionable thereon to provide stability to the sprinkler head 20. In an alternative embodiment, the crushed stone 48 is positionable below the sprinkler head 20, and the sprinkler head 20 can rest on top of the crushed stone 48. Additionally, the sprinkler head 20 has stability extensions 40, which are buried in the ground; helping to ensure the sprinkler head remains in a fixed position. In other embodiments, the sprinkler head 20 includes pointed flanges 28 (shown in FIG. 2) which are driven into the ground for increasing stability to the sprinkler assembly 10.

The sprinkler assembly 10 is electronically controlled through an irrigation timer coupled to the existing irrigation feed system. The irrigation timer is one similar to those known in the art and enables the sprinkler assembly 10 the unique ability to conserve water, while still being used as directed. The irrigation timer enables the sprinkler assembly 10 to be actuated and stopped, selectively set to go both on and off by means of the timer under certain preset parameters and conditions. This eliminates the need for dragging long lawn hoses across the yard to trip over or cause brown burn lines on the user's lawn when the sun beats down.

The sprinkler assembly 10 includes an adjustable water flow controller integrally coupled within the irrigation system for providing a means for selectively adjusting the water pressure at each sprinkler head as well as the ability to provide increased pressure at selective sprinkler heads or zones in order to provide a true water park "maze of water" effect. The water flow controller is similar to those well known in the art and contributes to water conservation.

The sprinkler assembly 10 is not only a solid and durably designed assembly, but it is gentle on feet, as children run and play over it, and is impervious to the elements (snow, ice, mowing, thatching, slice seeding). The sprinkler head 20 is winterized, and available in a plurality of different colors including grass green, mulch brown, pavement black, for camouflaging with the surroundings.

In conclusion, herein is presented a sprinkler assembly having a plurality of sprinkler heads integrally connected within an existing irrigation system. The invention is illustrated by example in the drawing figures, and throughout the written description. It should be understood that numerous variations are possible, while adhering to the inventive concept. Such variations are contemplated as being a part of the present invention.

What is claimed is:

1. A sprinkler assembly, comprising:
   at least one sprinkler head including a female inlet, a top surface having an attachment means, and at least one stability extension extending downwardly therefrom, wherein the stability extensions are pointed flanges;
   an irrigation feed system for supplying water to said sprinkler head, further comprising an irrigation timer coupled to the irrigation feed system;
   a hose for coupling the sprinkler head to the irrigation feed system;
   a swing joint coupling together said sprinkler head with said irrigation feed system, said swing joint having a first end and a second end, wherein said first end couples to said female inlet of said sprinkler head and said second end couples to said irrigation feed system; and
   a removable top coupled to said sprinkler head, said removable top having an opposing attachment means coupled to said attachment means of said top surface of said sprinkler head, said removable top having a plurality of openings.

2. The sprinkler assembly of claim 1, wherein the attachment means are a set of screws.

3. The sprinkler assembly of claim 1, further comprising an adjustable water flow controller coupled to the irrigation feed system.

4. The sprinkler assembly of claim 3, further comprising a rotating disk coupled to the top surface of the sprinkler head, wherein said rotating disk has extensions having a plurality of holes for allowing water to pass therethrough.

5. A sprinkler assembly, comprising:
   a sprinkler head including a female inlet, a top surface having a substantially round hole for accepting a screw therein, and at least one pointed flange extending downwardly therefrom;
   an irrigation feed system for supplying water to said sprinkler head;
   a swing joint coupling together said sprinkler head with said irrigation feed system, said swing joint having a first end and a second end, wherein said first end couples to said female inlet of said sprinkler head and said second end couples to said irrigation feed system;
   an irrigation timer coupled to said irrigation feed system;
   an adjustable water flow controller coupled to said irrigation feed system; and
   a removable top coupled to said sprinkler head, said removable top having an opposing substantially round hole which corresponds to said round hole of said top surface of said sprinkler head, said removable top having a plurality of openings.

6. The sprinkler assembly of claim 5, further comprising a hose for coupling the sprinkler head to the irrigation feed system.

7. The sprinkler assembly of claim 5, further comprising a rotating disk coupled to the top surface of the sprinkler head, wherein said rotating disk has extensions having a plurality of holes for allowing water to pass therethrough.

8. The sprinkler assembly of claim 5, further comprising at least one screw for securing he substantially round hole of the top surface of the sprinkler head with the opposing substantially round hole of the removable top.

9. A method of providing a safe, water park themed sprinkler adaptable to an existing irrigation feed system using the sprinkler assembly of claim 1, comprising the steps of:
   (a) determining the location of the sprinkler assembly by locating the existing irrigation feed system;
   (b) digging a ditch for installing the sprinkler head;
   (c) conserving water by coupling the irrigation timer to the existing irrigation feed system;
   (d) controlling water pressure by integrally coupling a water flow controller to the existing irrigation feed system for selectively adjusting and controlling water pressure at said sprinkler head;
   (e) installing said sprinkler head by coupling the second end of the spring joint to the existing irrigation feed system and the first end to the female inlet of said sprinkler head;
   (f) securing said sprinkler head by planting at least one pointed flange into the surrounding ground surface and placing crushed stone along the top surface of said sprinkler head;
   (g) placing the removable top onto said sprinkler head such that said removable top is flushed with the ground surface while in use;
   (h) securing said removable top to said sprinkler head by aligning the hole of the top surface of the sprinkler head with the opposing holes of the removable top and fastening the screws; and (i) enjoying the safe, water park themed sprinkler by allowing water to flow from the existing irrigation feed system through the swing joint and female inlet, out through the plurality of openings on the removable top.

10. The method of providing a safe, water park themed sprinkler adaptable to an existing irrigation feed system using the sprinkler assembly of claim 9, further comprising the steps of:
 (a) turning off the water flow automatically at the sprinkler head and removable top via the irrigation timer; and
 (b) preventing risk of injury to users by allowing said sprinkler assembly to remain flushed with the ground surface while not in use.

* * * * *